(12) United States Patent
Cota-Robles et al.

(10) Patent No.: US 7,272,831 B2
(45) Date of Patent: Sep. 18, 2007

(54) METHOD AND APPARATUS FOR CONSTRUCTING HOST PROCESSOR SOFT DEVICES INDEPENDENT OF THE HOST PROCESSOR OPERATING SYSTEM

(75) Inventors: Erik Cota-Robles, Portland, OR (US); Stephen Chou, North Plainfield, NJ (US); Stalinselvaraj Jeyasingh, Portland, OR (US); Alain Kagi, Portland, OR (US); Michael Kozuch, Beaverton, OR (US); Gilbert Neiger, Portland, OR (US); Richard Uhlig, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 836 days.

(21) Appl. No.: 09/823,482

(22) Filed: Mar. 30, 2001

(65) Prior Publication Data

US 2002/0143842 A1 Oct. 3, 2002

(51) Int. Cl.
*G06F 9/455* (2006.01)
*G06F 13/10* (2006.01)
*G06F 9/54* (2006.01)

(52) U.S. Cl. .......................... 718/1; 719/321
(58) Field of Classification Search ............ 718/1, 718/100–108; 719/310–332
See application file for complete search history.

(56) References Cited

U.S. PATENT DOCUMENTS

| | | | |
|---|---|---|---|
| 3,699,532 A | 10/1972 | Schaffer et al. | |
| 3,996,449 A | 12/1976 | Attanasio et al. | |
| 4,037,214 A | 7/1977 | Birney et al. | |
| 4,162,536 A | 7/1979 | Morley | |
| 4,207,609 A | 6/1980 | Luiz et al. | |
| 4,276,594 A | 6/1981 | Morley | |
| 4,278,837 A | 7/1981 | Best | |
| 4,307,447 A | 12/1981 | Provanzano et al. | |
| 4,319,233 A | 3/1982 | Matsuoka et al. | |
| 4,319,323 A | 3/1982 | Ermolovich et al. | |
| 4,366,537 A | 12/1982 | Heller et al. | |

(Continued)

FOREIGN PATENT DOCUMENTS

EP 0473913 3/1992

(Continued)

OTHER PUBLICATIONS

Ford, Bryan et al. "Microkernels Meet Recursive Virtual Machines." University of Utah. Technical Report UUCS-96-004, May 1996.*

(Continued)

*Primary Examiner*—Lewis A. Bullock, Jr.
(74) *Attorney, Agent, or Firm*—Blakely, Sokoloff, Taylor & Zafman LLP

(57) ABSTRACT

A method and apparatus for constructing host processor soft devices independent of the host processor operating system are provided. In one embodiment, a driver of a soft device is implemented in a virtual machine monitor (VMM), and the soft device is made available for use by one or more virtual machines coupled to the VMM. In an alternative embodiment, a software component of a soft device is implemented in a first virtual machine that is coupled to a VMM, and the soft device is made available for use by a second virtual machine coupled to the VMM.

21 Claims, 9 Drawing Sheets

U.S. PATENT DOCUMENTS

| | | | |
|---|---|---|---|
| 4,403,283 A | 9/1983 | Myntti et al. |
| 4,419,724 A | 12/1983 | Branigin et al. |
| 4,430,709 A | 2/1984 | Schleupen et al. |
| 4,521,852 A | 6/1985 | Guttag |
| 4,621,318 A | 11/1986 | Maeda |
| 4,759,064 A | 7/1988 | Chaum |
| 4,795,893 A | 1/1989 | Ugon |
| 4,802,084 A | 1/1989 | Ikegaya et al. |
| 4,825,052 A | 4/1989 | Chemin et al. |
| 4,907,270 A | 3/1990 | Hazard |
| 4,907,272 A | 3/1990 | Hazard |
| 4,910,774 A | 3/1990 | Barakat |
| 4,975,836 A | 12/1990 | Hirosawa et al. |
| 5,007,082 A | 4/1991 | Cummins |
| 5,022,077 A | 6/1991 | Bealkowski et al. |
| 5,075,842 A | 12/1991 | Lai |
| 5,187,802 A | 2/1993 | Inoue et al. |
| 5,230,069 A | 7/1993 | Brelsford et al. |
| 5,237,616 A | 8/1993 | Abraham et al. |
| 5,255,379 A | 10/1993 | Melo |
| 5,287,363 A | 2/1994 | Wolf et al. |
| 5,293,424 A | 3/1994 | Hotley et al. |
| 5,295,251 A | 3/1994 | Wakui et al. |
| 5,361,375 A | 11/1994 | Ogi |
| 5,421,006 A | 5/1995 | Jablon et al. |
| 5,434,999 A | 7/1995 | Goire et al. |
| 5,442,645 A | 8/1995 | Ugon et al. |
| 5,455,909 A | 10/1995 | Blomgren et al. |
| 5,459,867 A | 10/1995 | Adams et al. |
| 5,459,869 A | 10/1995 | Spilo |
| 5,469,557 A | 11/1995 | Salt et al. |
| 5,473,692 A | 12/1995 | Davis |
| 5,479,509 A | 12/1995 | Ugon |
| 5,506,975 A | 4/1996 | Onodera |
| 5,528,231 A | 6/1996 | Patarin |
| 5,533,126 A | 7/1996 | Hazard et al. |
| 5,555,385 A | 9/1996 | Osisek |
| 5,555,414 A | 9/1996 | Hough et al. |
| 5,560,013 A | 9/1996 | Scalzi et al. |
| 5,564,040 A | 10/1996 | Kubals |
| 5,566,323 A | 10/1996 | Ugon |
| 5,568,552 A | 10/1996 | Davis |
| 5,574,936 A | 11/1996 | Ryba et al. |
| 5,582,717 A | 12/1996 | Di Santo |
| 5,604,805 A | 2/1997 | Brands |
| 5,606,617 A | 2/1997 | Brands |
| 5,615,263 A | 3/1997 | Takahashi |
| 5,633,929 A | 5/1997 | Kaliski, Jr. |
| 5,657,445 A | 8/1997 | Pearce |
| 5,668,971 A | 9/1997 | Neufeld |
| 5,684,948 A | 11/1997 | Johnson et al. |
| 5,706,469 A | 1/1998 | Kobayashi |
| 5,717,903 A | 2/1998 | Bonola |
| 5,720,609 A | 2/1998 | Pfefferle |
| 5,721,222 A | 2/1998 | Bernstein et al. |
| 5,729,760 A | 3/1998 | Poisner |
| 5,740,178 A | 4/1998 | Jacks et al. |
| 5,752,046 A | 5/1998 | Oprescu et al. |
| 5,764,969 A | 6/1998 | Kahle et al. |
| 5,796,835 A | 8/1998 | Saada |
| 5,796,845 A | 8/1998 | Serikawa et al. |
| 5,805,712 A | 9/1998 | Davis |
| 5,809,546 A | 9/1998 | Greenstein et al. |
| 5,825,875 A | 10/1998 | Ugon |
| 5,825,880 A | 10/1998 | Sudia et al. |
| 5,835,594 A | 11/1998 | Albrecht et al. |
| 5,844,986 A | 12/1998 | Davis |
| 5,867,577 A | 2/1999 | Patarin |
| 5,890,189 A | 3/1999 | Nozue et al. |
| 5,900,606 A | 5/1999 | Rigal |
| 5,901,225 A | 5/1999 | Ireton et al. |
| 5,903,752 A | 5/1999 | Dingwall et al. |
| 5,919,257 A | 7/1999 | Trostle |
| 5,935,242 A | 8/1999 | Madany et al. |
| 5,935,247 A | 8/1999 | Pai et al. |
| 5,937,063 A | 8/1999 | Davis |
| 5,944,821 A | 8/1999 | Angelo |
| 5,956,408 A | 9/1999 | Arnold |
| 5,970,147 A | 10/1999 | Davis et al. |
| 5,978,475 A | 11/1999 | Schneier et al. |
| 5,978,481 A | 11/1999 | Ganesan et al. |
| 5,987,557 A | 11/1999 | Ebrahim |
| 6,014,745 A | 1/2000 | Ashe |
| 6,035,374 A | 3/2000 | Panwar et al. |
| 6,044,478 A | 3/2000 | Green |
| 6,058,478 A | 5/2000 | Davis |
| 6,061,794 A | 5/2000 | Angelo |
| 6,088,262 A | 7/2000 | Nasu |
| 6,092,095 A | 7/2000 | Maytal |
| 6,093,213 A | 7/2000 | Favor et al. |
| 6,108,644 A | 8/2000 | Goldschlag et al. |
| 6,115,816 A | 9/2000 | Davis |
| 6,131,166 A | 10/2000 | Wong-Isley |
| 6,158,546 A | 12/2000 | Hanson et al. |
| 6,173,417 B1 | 1/2001 | Merrill |
| 6,175,924 B1 | 1/2001 | Arnold |
| 6,175,925 B1 | 1/2001 | Nardone et al. |
| 6,178,509 B1 | 1/2001 | Nardone et al. |
| 6,188,257 B1 | 2/2001 | Buer |
| 6,199,152 B1 | 3/2001 | Kelly et al. |
| 6,205,550 B1 | 3/2001 | Nardone et al. |
| 6,212,635 B1 | 4/2001 | Reardon |
| 6,222,923 B1 | 4/2001 | Schwenk |
| 6,252,650 B1 | 6/2001 | Nakaumra |
| 6,269,392 B1 | 7/2001 | Cotichini et al. |
| 6,275,933 B1 | 8/2001 | Fine et al. |
| 6,282,650 B1 | 8/2001 | Davis |
| 6,282,651 B1 | 8/2001 | Ashe |
| 6,282,657 B1 | 8/2001 | Kaplan et al. |
| 6,308,270 B1 | 10/2001 | Guthery et al. |
| 6,327,652 B1 | 12/2001 | England et al. |
| 6,330,670 B1 | 12/2001 | England et al. |
| 6,357,004 B1 | 3/2002 | Davis |
| 6,363,485 B1 | 3/2002 | Adams |
| 6,374,286 B1 | 4/2002 | Gee et al. |
| 6,378,068 B1 | 4/2002 | Foster |
| 6,378,072 B1 | 4/2002 | Collins et al. |
| 6,389,537 B1 | 5/2002 | Davis et al. |
| 6,397,379 B1 | 5/2002 | Yates, Jr. et al. |
| 6,412,035 B1 | 6/2002 | Webber |
| 6,421,702 B1 | 7/2002 | Gulick |
| 6,435,416 B1 | 8/2002 | Slassi |
| 6,445,797 B1 | 9/2002 | McGough et al. |
| 6,463,535 B1 | 10/2002 | Drews et al. |
| 6,463,537 B1 | 10/2002 | Tello |
| 6,496,847 B1 * | 12/2002 | Bugnion et al. ............... 718/1 |
| 6,507,904 B1 | 1/2003 | Ellison et al. |
| 6,529,909 B1 | 3/2003 | Bowman-Amuah |
| 6,535,988 B1 | 3/2003 | Poisner |
| 6,557,104 B2 | 4/2003 | Vu et al. |
| 6,560,627 B1 | 5/2003 | McDonald et al. |
| 6,609,199 B1 | 8/2003 | DeTreville |
| 6,615,278 B1 | 9/2003 | Curtis |
| 6,629,178 B1 * | 9/2003 | Smith .................. 710/240 |
| 6,633,963 B1 | 10/2003 | Ellison et al. |
| 6,633,981 B1 | 10/2003 | Davis |
| 6,651,171 B1 | 11/2003 | England et al. |
| 6,678,825 B1 | 1/2004 | Ellison et al. |
| 6,684,326 B1 | 1/2004 | Cromer et al. |
| 6,789,156 B1 * | 9/2004 | Waldspurger .................. 711/6 |
| 6,795,966 B1 * | 9/2004 | Lim et al. ..................... 718/1 |
| 6,934,269 B1 * | 8/2005 | Hasha et al. .............. 370/312 |
| 2001/0027511 A1 | 10/2001 | Wakabayashi et al. |
| 2001/0037450 A1 | 11/2001 | Metlitski et al. |

| | | | |
|---|---|---|---|
| 2002/0007456 | A1 | 1/2002 | Peinado et al. |
| 2002/0023032 | A1 | 2/2002 | Pearson et al. |
| 2002/0147916 | A1 | 10/2002 | Strongin et al. |
| 2002/0166061 | A1 | 11/2002 | Falik et al. |
| 2002/0169717 | A1 | 11/2002 | Challener |
| 2003/0018892 | A1 | 1/2003 | Tello |
| 2003/0074548 | A1 | 4/2003 | Cromer et al. |
| 2003/0115453 | A1 | 6/2003 | Grawrock |
| 2003/0126442 | A1 | 7/2003 | Glew et al. |
| 2003/0126453 | A1 | 7/2003 | Glew et al. |
| 2003/0159056 | A1 | 8/2003 | Cromer et al. |
| 2003/0188179 | A1 | 10/2003 | Challener et al. |
| 2003/0196085 | A1 | 10/2003 | Lampson et al. |
| 2004/0117539 | A1 | 6/2004 | Bennett et al. |
| 2005/0198632 | A1* | 9/2005 | Lantz et al. .................. 718/1 |

FOREIGN PATENT DOCUMENTS

| | | | |
|---|---|---|---|
| EP | 0600112 | A1 | 6/1994 |
| EP | 0602867 | | 6/1994 |
| EP | 0892521 | | 1/1999 |
| EP | 0930567 | A3 | 7/1999 |
| EP | 0961193 | | 12/1999 |
| EP | 0965902 | | 12/1999 |
| EP | 1055989 | | 11/2000 |
| EP | 1056014 | | 11/2000 |
| EP | 1085396 | | 3/2001 |
| EP | 1146715 | A1 | 10/2001 |
| EP | 1209563 | | 5/2002 |
| EP | 1271277 | | 1/2003 |
| WO | WO9524696 | | 9/1995 |
| WO | WO9812620 | | 3/1998 |
| WO | WO98/34365 | | 8/1998 |
| WO | WO98/44402 | | 10/1998 |
| WO | WO99/05600 | | 2/1999 |
| WO | WO99/09482 | | 2/1999 |
| WO | WO9918511 | | 4/1999 |
| WO | WO99/57863 | | 11/1999 |
| WO | WO9965579 | | 12/1999 |
| WO | WO0021238 | | 4/2000 |
| WO | WO 00/62232 | | 10/2000 |
| WO | WO0163994 | | 8/2001 |
| WO | WO0201794 | | 1/2002 |
| WO | WO02060121 | | 8/2002 |
| WO | WO03058412 | | 7/2003 |

OTHER PUBLICATIONS

Govil, Kinshuk et al. "Cellular Disco: Resource Management Using Virtual Clusters on Shared Memory Multiprocessors." ACM. Aug. 2000.*
Bugnion, Edouard et al. "Disco: Running Commodity Operating Systems on Scalable Multiprocessors." ACM. Nov. 1997.*
Sugerman, Jeremy et al. "Virtualizing I/O Devices on VMare Workstation's Hosted Virtual Machine Monitor." USENIX Association. Jun. 25-30, 2001.*
Nieh, Jason et al. "Examining VMare". Dr. Dobb's Journal, Aug. 2000.*
Kraimer, M. "EPICS: porting iocCore to multiple operating Systems." Sep. 30, 1999.*
Berg, Cliff, "How Do I Create A Signed Applet?" Dr. Dobb's Journal, Aug. 1997, pp. 1-9.
Goldberg, Robert P., "Survey of Virtual Machine Research," IEEE Computer Magazine vol. 7, No. 6, pp. 34-45, 1974.
Gong, Li, et al., "Going Beyond the Sandbox: An Overview of the New Security Architecture in the Java Development Kit 1.2," JavaSoft, Sun Microsystems, Inc., Proceedings of the USENIX Symposium on Internet Technologies and Systems, Monterey, California, 11 pages Dec. 1997.
Gum, P.H., "System/370 Extended Architecture: Facilities for Virtual Machines," IBM J. Research Development, vol. 27, No. 6, pp. 530-544, Nov. 1983.
Heinrich, J., "MIPS R4000 Microprocessor User's Manual," Second Edition, Chapter 4: Memory Management, pp. 67-79.

Intel Corporation, Intel386™ DX Microprocessor, 32-Bit CHMOS Microprocessor With Integrated Memory Management, 56 pages, Dec. 1995.
Lawton, K., "Running Multiple Operation Systems Concurrently On An IA32 PC Using Virtualization Techniques," http://plex86.org/research/paper.txt., pp. 1-31, downloaded Aug. 9, 2001.
Motorola, M68040 User's Manual (Including the MC68040, MC68040V, MC68LC040, MC68EC040, and MC68EC040V), Revised 1993.
Rosenblum, M., "VMware's Virtual Platform™ A Virtual Machine Monitor for Commodity PCs," Proceedings of the 11th Hotchips Conference, Stanford University Palo Alto, California, pp. 185-196, Aug. 1999.
Hall, Judith S., et al., "Virtualizing the VAX Architecture," ACM SIGARCH Computer Architecture News, Proceedings of the 18th annual international symposium on Computer architecture, vol. 19, Issue No. 3, Apr. 1991, 10 pages.
Menezes, Alfred J., et al., "Handbook of Applied Cryptography", *CRC Press LLC*, USA XP002201307, (1997),475.
Brands, Stefan, "Restrictive Blinding of Secret-Key Certificates", *Springer-Verlag XP002201306*, (1995),Chapter 3.
Davida, George I., et al., "Defending Systems Against Viruses through Cryptographic Authentication", *Proceedings of the Symposium on Security and Privacy*, IEEE Comp. Soc. Press, ISBN 0-8186-1939-2,(May 1989).
INTEL, "IA-32 Intel Architecture Software Developer's Manual", vol. 3: *System Programming Guide*, Intel Corporation—2003,13-1 through 13-24.
Luke, Jahn, et al., "Replacement Strategy for Aging Avionics Computers", *IEEE AES Systems Magazine*, XP002190614,(Mar. 1999).
Menezes, Oorschot, "Handbook of Applied Cryptography", *CRC Press LLC*, USA XP002201307, (1997),475.
Richt, Stefan, et al., "In-Circuit-Emulator Wird Echtzeittauglich", *Elektronic, Franzis Verlag GMBH*, Munchen, DE, vol. 40, No. 16, XP000259620,(100-103),Aug. 6, 1991.
Saez, Sergio, et al., "A Hardware Scheduler for Complex Real-Time Systems", *Proceedings of the IEEE International Symposium on Industrial Electronics*, XP002190615,(Jul. 1999),43-48.
Sherwood, Timothy, et al., "Patchable Instruction ROM Architecture", *Department of Computer Science and Engineering*, University of California, San Diego, La Jolla, CA, (Nov. 2001).
Heinrich, J., "MIPS R4000 Microprocessor User's Manual," Chapter 4, Memory Management, pp. 61-97, 1993.
Coulouris, George, et al., "Distributed Systems, Concepts and Designs", *2nd Edition*, (1994),422-424.
Crawford, John, "Architecture of the Intel 80386", *Proceedings of the IEEE International Conference on Computer Design: VLSI in Computers and Processors (ICCD '86)*, (Oct. 6, 1986),155-160.
Fabry, R.S., "Capability-Based Addressing", Fabry, R.S., "*Capability-Based Addressing,*" *Communications of the ACM*, vol. 17, No. 7, (Jul. 1974),403-412.
Frieder, Gideon, "The Architecture And Operational Characteristics of the VMX Host Machine", *The Architecture And Operational Characteristics of the VMH Host Machine, IEEE.*, (1982),9-16.
HP Mobile Security Overview, "HP Mobile Security Overview", (Sep. 2002), 1-10.
IBM Corporation, "IBM ThinkPad T30 Notebooks", *IBM Product Specification*, located at www-1.ibm.com/services/files/cisco_t30_spec_sheet_070202.pdf, last visited Jun. 23, 2004,(Jul. 2, 2002),1-6.
Intel Corporation, "IA-64 System Abstraction Layer Specification", *Intel Product Specification*Order No. 245359-001, (Jan. 2000),1-112.
Intel Corporation, "Intel 82802AB/82802AC Firmware Hub (FWH)", *Intel Product Datasheet*, (Nov. 2000),1-6,17-28.
Intel Corporation, "Intel IA-64 Architecture Software Developer's Manual", vol. 2: *IA-64 System Architecture*Order No. 245318-001, (Jan. 2000),i, ii, 5.1-5.3, 11.1-11.8, 11.23-11.26.
Menezes, Alfred J., et al., "Handbook of Applied Cryptography", *CRC Press Series on Discrete Mathematics and its Applications*, Boca Raton, FL, XP002165287, ISBN 084938537,(Oct. 1996),403-405, 506-515, 570.

Nanba, S., et al., "VM/4: ACOS-4 Virtual Machine Architecture", *VM/4: ACOS-4 Virtual Machine Architecture, IEEE*, (1985),171-178.

RSA Security, "Hardware Authenticators", www.rsasecurity.com/node.asp?id=1158, 1-2.

RSA Security, "RSA SecurID Authenticators", www.rsasecurity.com/products/securid/datasheets/SID_DS_0103.pdf, 1-2.

RSA Security, "Software Authenticators", www.srasecurity.com/node.asp?id=1313, 1-2.

Schneier, Bruce, "Applied Crytography: Protocols, Algorithm, and Source Code in C", Wiley, John & Sons, Inc., XP002939871; ISBN 0471117099, (Oct. 1995),47-52.

Schneier, Bruce, "Applied Crytography: Protocols, Algorithm, and Source Code in C", Wiley, John & Sons, Inc., XP002138607; ISBN 0471117099, (Oct. 1995), 56-65.

Schneier, Bruce, "Applied Cryptography: Protocols, Algorithms, and Source Code C", Wiley, John & Sons, Inc., XP0021111449; ISBN 0471117099, (Oct. 1995), 169-187.

Schneier, Bruce, "Applied Crytography: Protocols, Algorithms, and Source Code in C", *2nd Edition*; Wiley, John & Sons, Inc., XP002251738; ISBN 0471128457, (Nov. 1995), 28-33; 176-177; 216-217; 461-473; 518-522.

* cited by examiner

US 7,272,831 B2

METHOD AND APPARATUS FOR CONSTRUCTING HOST PROCESSOR SOFT DEVICES INDEPENDENT OF THE HOST PROCESSOR OPERATING SYSTEM

FIELD OF THE INVENTION

The present invention relates generally to virtual machines, and more specifically to constructing host processor soft devices independent of the host processor operating system.

BACKGROUND OF THE INVENTION

A host-based soft device is a hardware device that includes a host software component and a reduced functionality hardware component: respectively a host processor device driver and a "residual" fixed function device. The host processor device driver replaces portions of a fixed function device in a personal computing system (e.g., personal computers, personal digital assistants, etc.). Conventional fixed function devices incorporate one or more dedicated general and special purpose processors (e.g., a microcontroller, a digital signal processor, etc.) and a limited amount of dedicated random access memory (RAM) and read-only memory (ROM). In a host-based soft device, software that executes on one or more dedicated processors is replaced by a host processor device driver that uses main system memory. Typically, a host-based soft device is less expensive than the conventional fixed function devices because the "residual" fixed function device that requires fewer dedicated processors and smaller amounts of dedicated RAM and ROM. In addition, because the host processor is far more powerful than the dedicated processors and has access to more memory, a host-based soft device is often able to use more powerful algorithms, thereby improving performance, increasing efficiency and/or providing higher benchmark scores.

Despite the above advantages of host-based soft devices, their implementation has been limited almost entirely to Microsoft Windows operating systems due to the large market share of Windows family of operating systems, leaving other personal computer operating systems (e.g., BeOS) without available host-based soft devices. In addition, the development of a soft device for Windows has not been an easy process. Recent experience with Windows-based soft devices has shown the inability of Microsoft to develop a stable device driver model. For instance, during the year of 1999, soft modem vendors were simultaneously required to port device software to four different soft modem device drivers for each soft device: specifically, VxD for Windows 98, WDM 1.0 for Windows 98SE, NT for Windows NT 4.0 and WDM 2.0 for Beta releases of Windows 2000. In addition, Windows-based soft devices suffer from excessive latency in the host operating system because Windows operating systems lack real-time quality of service (QoS) guarantees.

Therefore, it would be advantageous to construct a host processor soft device that would be independent of the host processor operating system.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EMBODIMENTS

Figure 1:
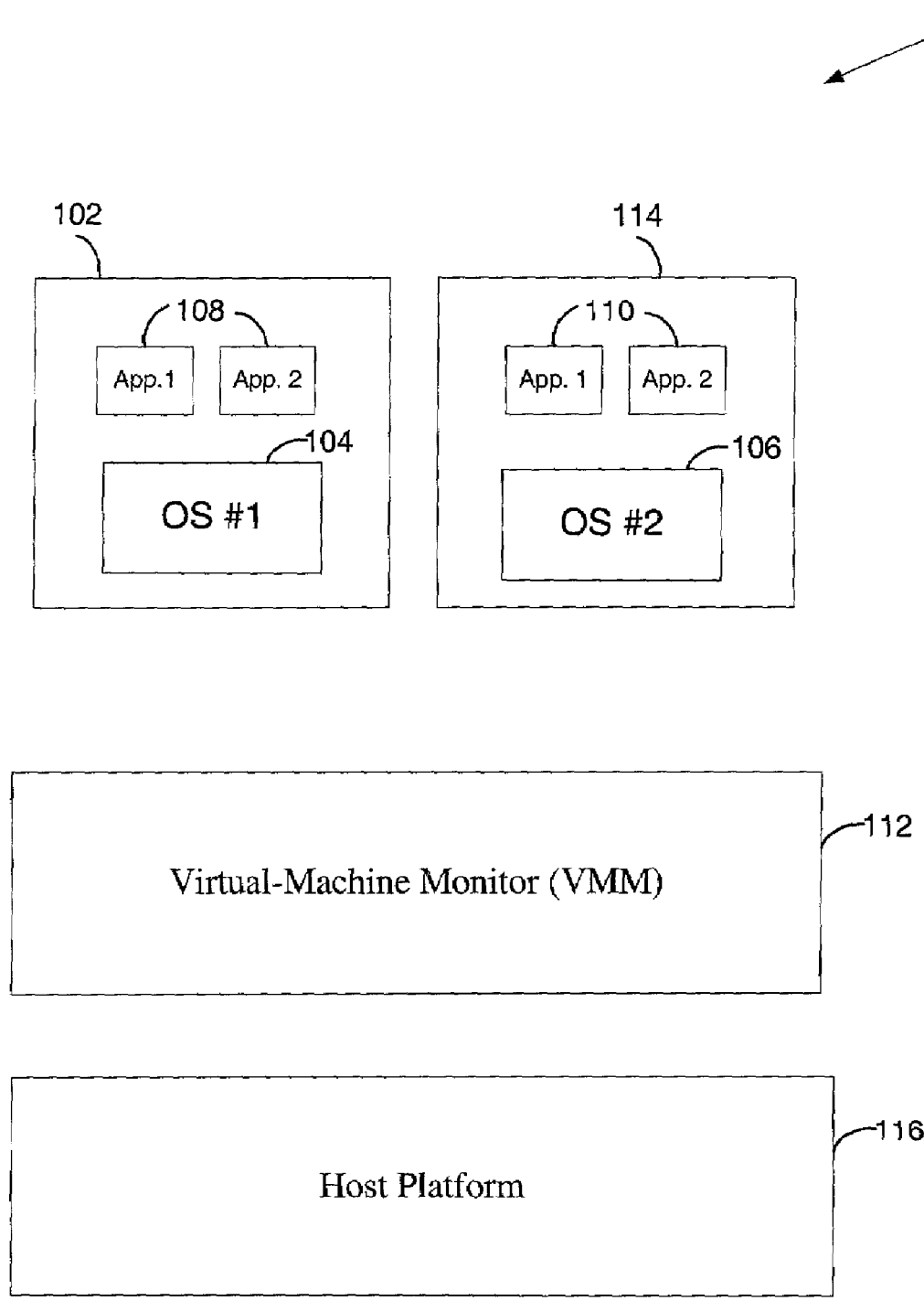
FIG. 1 illustrates one embodiment of a virtual-machine environment.

Methods and apparatus for constructing host processor soft devices independent of the host processor operating system are described. In the following descriptions, for purposes of explanation, numerous specific details are set forth in order to provide a thorough understanding of the present invention. It will be apparent, however, to one skilled in the art that the present invention can be practiced without these specific details.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus. Instructions are executable using one or more processing devices (e.g., processors, central processing units, etc.).

The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

FIG. 1 illustrates one embodiment of a virtual-machine environment 100, in which the present invention may operate. The host platform 116 is capable of executing a virtual machine monitor (VMM) 112. The VMM 112, though typically implemented in software, exports a bare machine interface to higher level software. The interface is exported as one or more virtual machines (VMs) and may mirror the actual host hardware platform, so that it is virtualized. Alternatively, the interface exported by the VMM 112 may differ in some or all respects so that a different platform is emulated. The higher level software may comprise a standard or real-time OS, although the invention is not limited in scope in this respect and, alternatively, for example, the VMM 104 may be run within, or on top of, another VMM. VMMs and their typical features and functionality are well-known by those skilled in the art and may be implemented, for example, in software, firmware or by a combination of various techniques.

As described above, the VMM 112 presents to other software (i.e., "guest" software) the abstraction of one or more virtual machines (VMs). FIG. 1 shows VMs 102 and 114. VMs 102 and 114 run their own guest operating systems: guest OSes 104 and 106. The guest OS is provided with the illusion of executing on the host platform, rather than in a virtual platform. In one embodiment, the virtual abstraction presented to the guest OS matches the characteristics of the host platform 116. Alternatively, the virtual abstraction presented to the guest OS differs from the characteristics of the host platform 116. The VMM 112 provides protection between VMs 102 and 114 and can observe and restrict the activities of the VMs 102 and 114.

Figure 2:
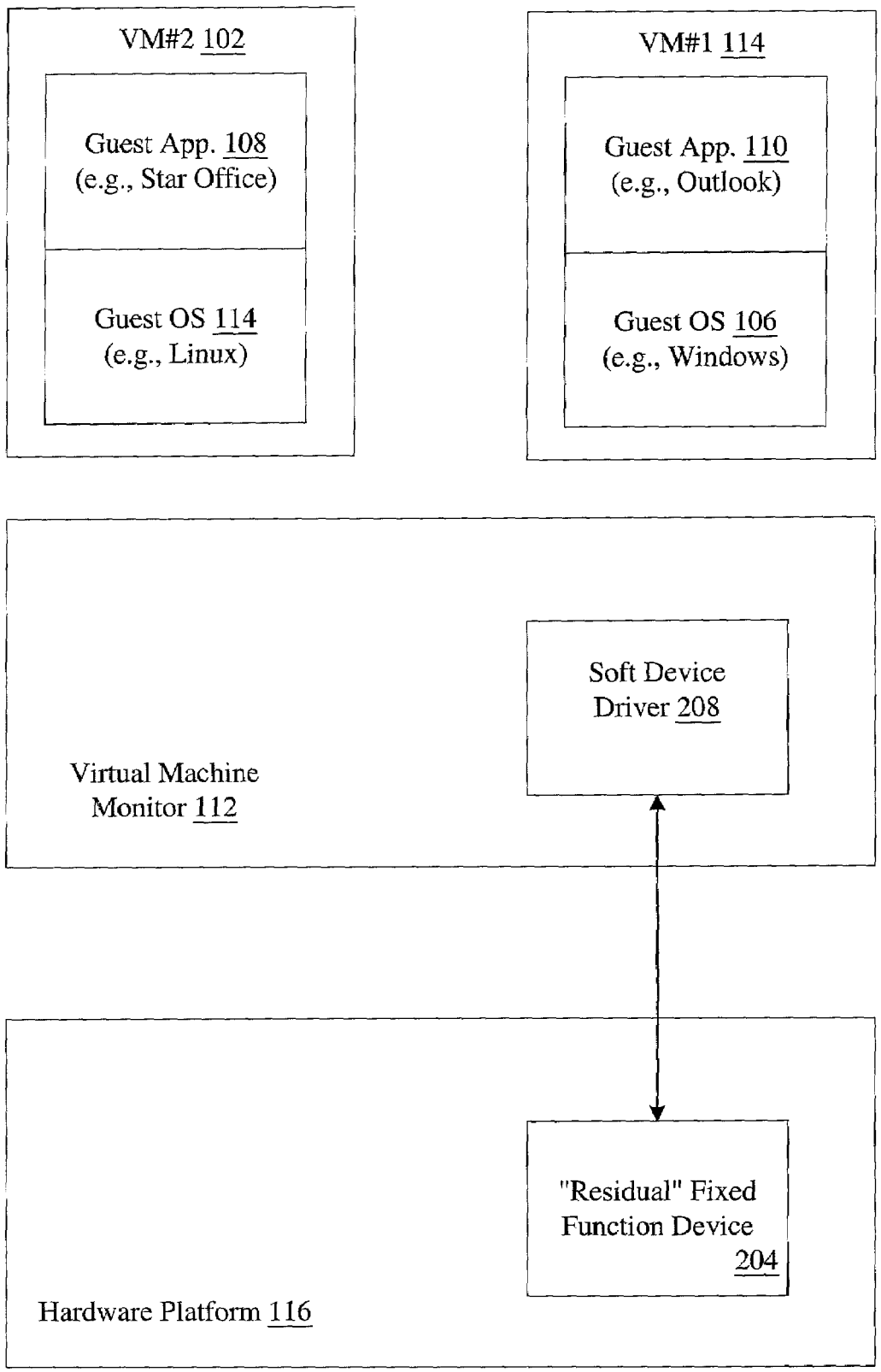
FIG. 2 is a block diagram of a system in which a soft device driver is implemented in a virtual machine monitor (VMM), according to one embodiment of the present invention.

The present invention provides a mechanism for constructing a host processor soft device independent of the host processor OS (host OS) in a virtual-machine environment. FIG. 2 illustrates one embodiment of a system, in which a soft device is constructed in a manner that does not depend on any particular host OS.

Referring to FIG. 2, a software component 208 of the soft device is implemented as a soft device driver directly in the VMM 122. The soft device driver 208 controls a hardware component of the soft device identified as a "residual" fixed function device 204. Accordingly, any guest OS 106 or 114 (e.g., Windows or Linux) can access the soft device driver 208 and use the soft device as needed.

The soft device driver 208 can be implemented in the same manner as a host-based soft device driver would be implemented in a conventional host OS. However, while a host OS soft device driver operates in such a way as to export a standard device abstraction to the host OS, the soft device driver 208 implemented in the VMM 112 exports an emulation of a fixed function hardware device to VMs 102 and/or 114. The guest OS 106 or 114 then runs a standard device driver and attempts to read from, and write to, hardware registers of an emulated fixed function hardware device. The soft device driver 208 recognizes these attempts of the guest OS 106 or 114 to interact with hardware registers that may not exist and emulates the functionality of a fixed function hardware device.

In some embodiments (e.g., when the corresponding functionality is performed by the host processor), the soft device driver 208 emulates the functionality of a fixed function device by performing the requested computations without any notification to the residual fixed function device 204.

In other embodiments, the soft device driver may pass the read or write command without alteration to the residual fixed function device 204 to perform an operation requested by the guest OS 106 or 114.

In still other embodiments, the soft device driver 208 may perform some of the requested computations and may then perform one or a whole series of similar or completely different operations on the actual hardware registers of the residual fixed function device 204 in order to complete the task that the guest OS 106 or 114 requested.

In yet other embodiments, the residual fixed function device 204 is capable of directly accessing system memory. In one embodiment, the soft device driver 208 performs zero or more transformations on data received from guest OS 106 or 114 before directly transferring the data to system memory at a predefined location from which the residual fixed function device 204 will fetch the data in order to effect the operation requested by the guest OS 106 or 114. In another embodiment, the soft device driver 208 performs zero or more transformations on data directly transferred to system memory at a predefined location by the residual fixed function device 204, said transformed data then being transferred to the guest OS 106 or 114 in order to complete the requested operation.

Figure 3:
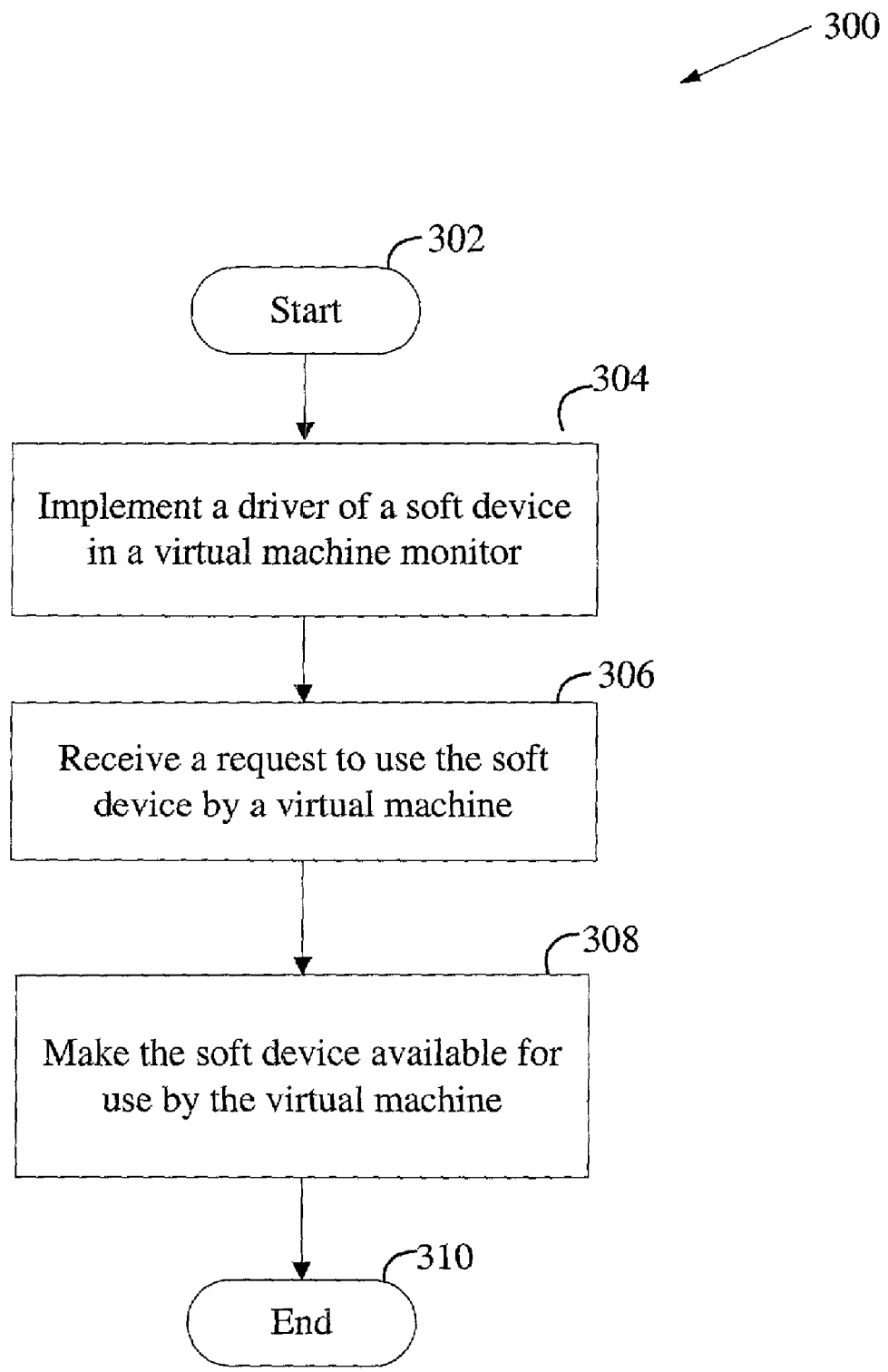
FIG. 3 is a flow diagram of a method for constructing a soft device via a VMM implementation, according to one embodiment of the present invention.

FIG. 3 is a flow diagram of a method 300 for constructing a soft device via a VMM implementation, according to one embodiment of the present invention. Method 300 begins with implementing a soft device driver in a VMM (processing block 304). As described above, it may be done in the same well known in the art manner as for implementing a soft device driver in a conventional host OS.

Subsequently, when a request to use the soft device is received from a virtual machine coupled to the VMM (processing block 306), the soft device is made available for use by this virtual machine (processing block 308). In one embodiment, making the soft device available for use by the virtual machine includes exporting an emulation of a fixed function hardware device to this virtual machine, recognizing the attempts of the virtual machine to read and write to hardware registers of the emulated device, and emulating the functionality of a fixed function hardware device to perform the read and or write operation requested by the virtual machine. In one embodiment, this functionality is emulated by the soft device driver performing the requested computations without any notification to a hardware component of the soft device (i.e., a residual fixed function device). In an alternative embodiment, the functionality is emulated by the hardware component of the soft device which receives the read or write command from the soft device driver and executes this command to perform an operation requested by the virtual machine. In still another embodiment, the soft device driver performs some of the requested computations and then performs one or a whole series of similar or completely different operations on the actual hardware registers of the residual fixed function device in order to complete the task intended by the virtual machine. In yet another embodiment, the residual fixed function device 204 is capable of directly accessing system memory and transfers data to or from system memory at predefined locations, and the soft device driver manipulates data stored in memory according to the operation requested by the virtual machine. For instance, the soft device driver performs the write command received from the virtual machine by transforming the data in the memory appropriately and then transferring the requested data to the memory using the direct memory access (DMA) technique.

It should be noted that any combination of the above actions can be used by the soft device driver to emulate the functionality of a fixed function hardware device without loss of generality. In one embodiment, the virtual machine runs an arbitrary OS (e.g., Linux), for which no soft device drivers exist on the market. Accordingly, the VMM implementation of a soft device driver enables a soft device to be accessed from a wide variety of host OSes, including host OSes for which no appropriate soft device drivers exist on the market. In addition, such soft device drivers do not suffer from latency problems in the host OS because they are implemented beneath the host OS.

Figure 4:
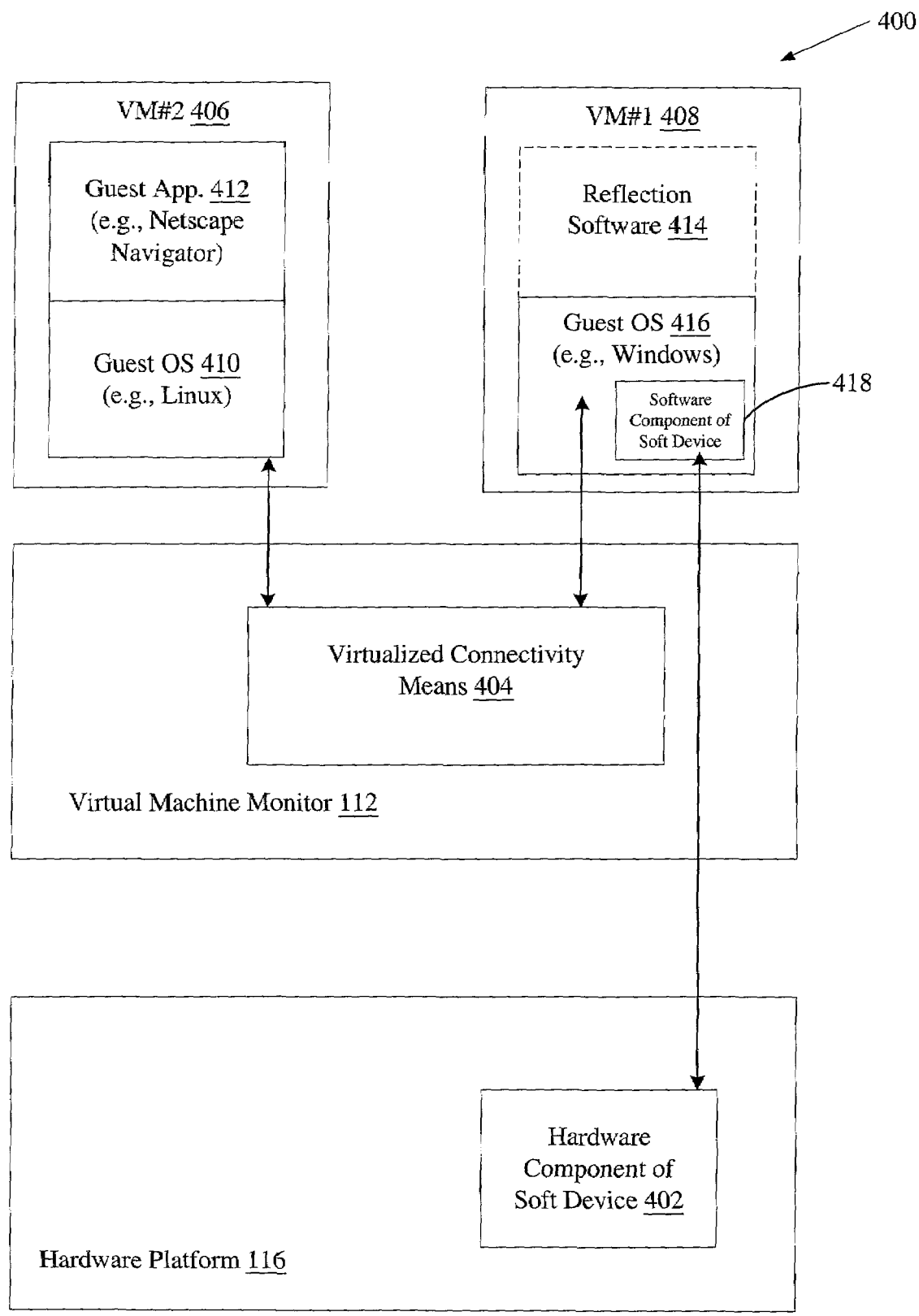
FIG. 4 is a block diagram of a system in which a software component of a soft device is implemented in a virtual machine, according to one embodiment of the present invention.

FIG. 4 is a block diagram of a system in which a software component of a soft device is implemented in a virtual machine, according to one embodiment of the present invention. Referring to FIG. 4, a software component 418 of a soft device is implemented in a dedicated virtual machine 408. The dedicated virtual machine 408 runs a guest OS 416, and a separate virtual machine 406 runs a guest OS 410 with which the user interacts. The dedicated virtual machine 408 is scheduled for execution on the host processor using any of the methods known in the art that are sufficient to provide the virtual machine 408 with real-time quality of service (QoS) guarantees.

The VMM 112 ensures that the soft device is available for use by the virtual machine 406 when needed. In particular, the VMM 112 provides such communication between the virtual machines 406 and 408 as to make the soft device controlled by the dedicated virtual machine 408 available to the virtual machine 406. This communication is accomplished using a virtualized connectivity means 404 that represents a software version of such connectivity means as a local area network (LAN) (presented to each of VMs 406 and 408 as a virtual network interface card (NIC)), a serial communications link (presented to each of VMs 406 and 408 as a virtual serial port (e.g., COM 1)), a universal serial bus (USB) to USB bridge (presented to each of VMs 406 and 408 as a virtual USB "host controller" connected to a USB to USB bridge device), a peripheral component interconnect (PCI) bus, a USB connection (presented to VM 406 as a virtual USB "host controller" and to VM 408 as a virtual USB bus interface), etc. The virtual machine implementation of a soft device allows construction of a soft device that is not only OS independent but also VMM independent. That is, the soft device driver does not need to be written for use with a particular VMM. Again, such a soft device is immune to latency in the host OS because its driver is executed in a dedicated virtual machine.

In one embodiment, the dedicated virtual machine 408 includes reflection software 414 (e.g., a reflection application or driver) which links the software component 418 (e.g., a soft device driver) and the virtualized connectivity means together. For instance, the reflection software 414 may be configured to read from the serial port COM1 and write to the soft device driver, and vice versa. In alternative embodiments, a direct communication between the software component 418 and the virtualized connectivity means is provided, thereby obviating the need for the reflection software 414.

In one embodiment, the dedicated virtual machine 408 is configured to match the underlying host platform. In this embodiment, the dedicated virtual machine 408 may execute a conventional soft device driver that is written for the OS 416. For instance, the dedicated virtual machine may execute a soft modem driver under Windows NT 4.0. The virtual machine 406 may instead run an arbitrary OS for which no soft device driver need be or have been written. For instance, the virtual machine 406 may run Linux, Unix, BeOS, or any other OS. When the dedicated virtual machine 408 is configured to match the underlying host platform, the VMM 112 may present the dedicated virtual machine 408 to the virtual machine 406 as an external conventional fixed function device using a virtualized serial communications port (COML) or virtualized USB "host controller" or as an internal conventional fixed function device using a virtualized local bus (e.g., a PCI bus). These embodiments of the present invention will be described in greater detail below in conjunction with FIG. 6A. Alternatively, the VMM 112 emulates a network communication between the dedicated virtual machine 408 and other one or more virtual machines coupled to the VMM 112 using a virtualized LAN, as will be described in greater detail below in conjunction with FIG. 6B.

In an alternative embodiment, the dedicated virtual machine 408 is configured to match an existing hardware device (e.g., a PCI card, a USB device, etc.), and may differ significantly from the host platform. In this embodiment which is described in more detail below in conjunction with FIG. 6C, the VMM 112 emulates communication between the virtual machines 406 and 408 using a virtualized PCI bus or a virtualized USB connection.

Figure 5:
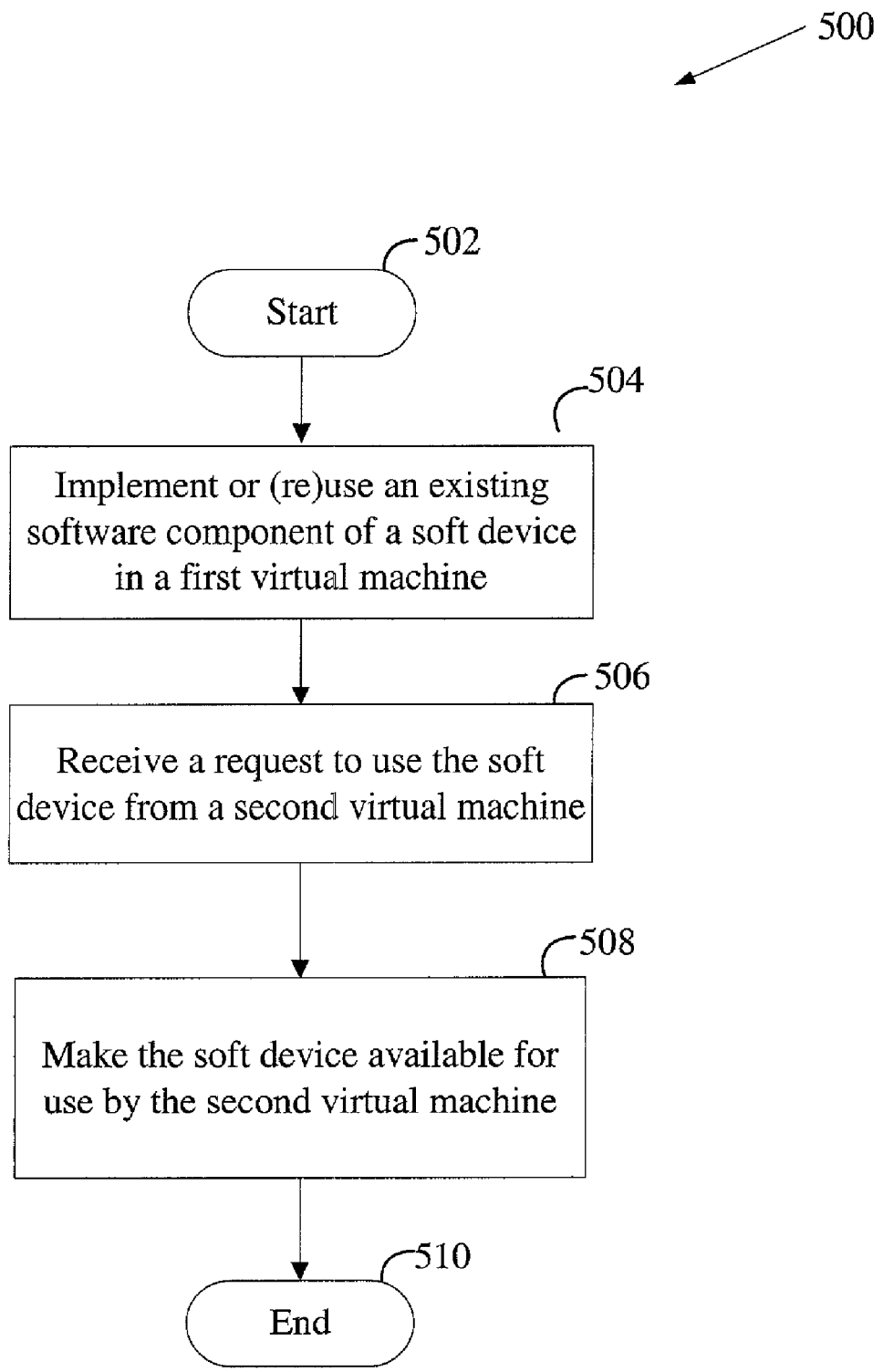
FIG. 5 is a flow diagram of a method for constructing a soft device via a virtual machine implementation, according to one embodiment of the present invention.

FIG. 5 is a flow diagram of a method 500 for constructing a soft device via a virtual machine implementation, according to one embodiment of the present invention. Method 500 begins at processing block 504 with implementing a software component of a soft device in a dedicated VM which is coupled to a virtual machine monitor. In one embodiment, the software component is a soft device driver. Alternatively, the software component is an existing software component that has been previously implemented for a bare hardware platform. As described above, the user interacts with another virtual machine (referred to as a main virtual machine) that is also coupled to the VMM. In one embodiment, the dedicated virtual machine is configured to match the underlying host platform. Alternatively, the dedicated virtual machine is configured to match an existing hardware device and does not match the host platform. In one embodiment, the main virtual machine runs an arbitrary OS for which no soft device drivers exist on the market.

Subsequently, when a request to use the soft device is received from the main virtual machine (processing block 506), the soft device is made available for use by the main virtual machine (processing block 508).

In one embodiment, making the soft device available for use by the main virtual machine includes presenting the dedicated virtual machine to the main virtual machine as either an external or an internal conventional fixed function device and emulating communication between the dedicated virtual machine and the main virtual machine. This communication is emulated by providing a virtualized connectivity means, linking the virtualized connectivity means to the soft device driver, trapping all accesses by one of the two virtual machines to the virtualized connectivity means, and re-directing these accesses to the other of the two virtual machines. In one embodiment, the virtualized connectivity means is a virtualized serial communications link. Alternatively, the virtualized connectivity means is a virtualized USB to USB bridge or a virtualized local bus such as a PCI bus.

In another embodiment, making the soft device available for use by the main virtual machine includes emulating a virtual network that connects the dedicated virtual machine to the main virtual machine and to any other virtual machine coupled to the VMM using a virtualized LAN. The communication between the virtual machines is then emulated by trapping all accesses to the virtualized LAN and reflecting them to the appropriate virtual machine.

In yet another embodiment, making the soft device available for use by the main virtual machine includes configuring the dedicated virtual machine to match an existing hardware device, such as a PCI card, a USB device or any other standard PC peripheral device, and emulating communication between the dedicated virtual machine and the main virtual machine using, respectively, a virtualized PCI bus, a virtualized USB connection, or a virtualized bus, connection or link appropriate to the device.

Figure 6A:
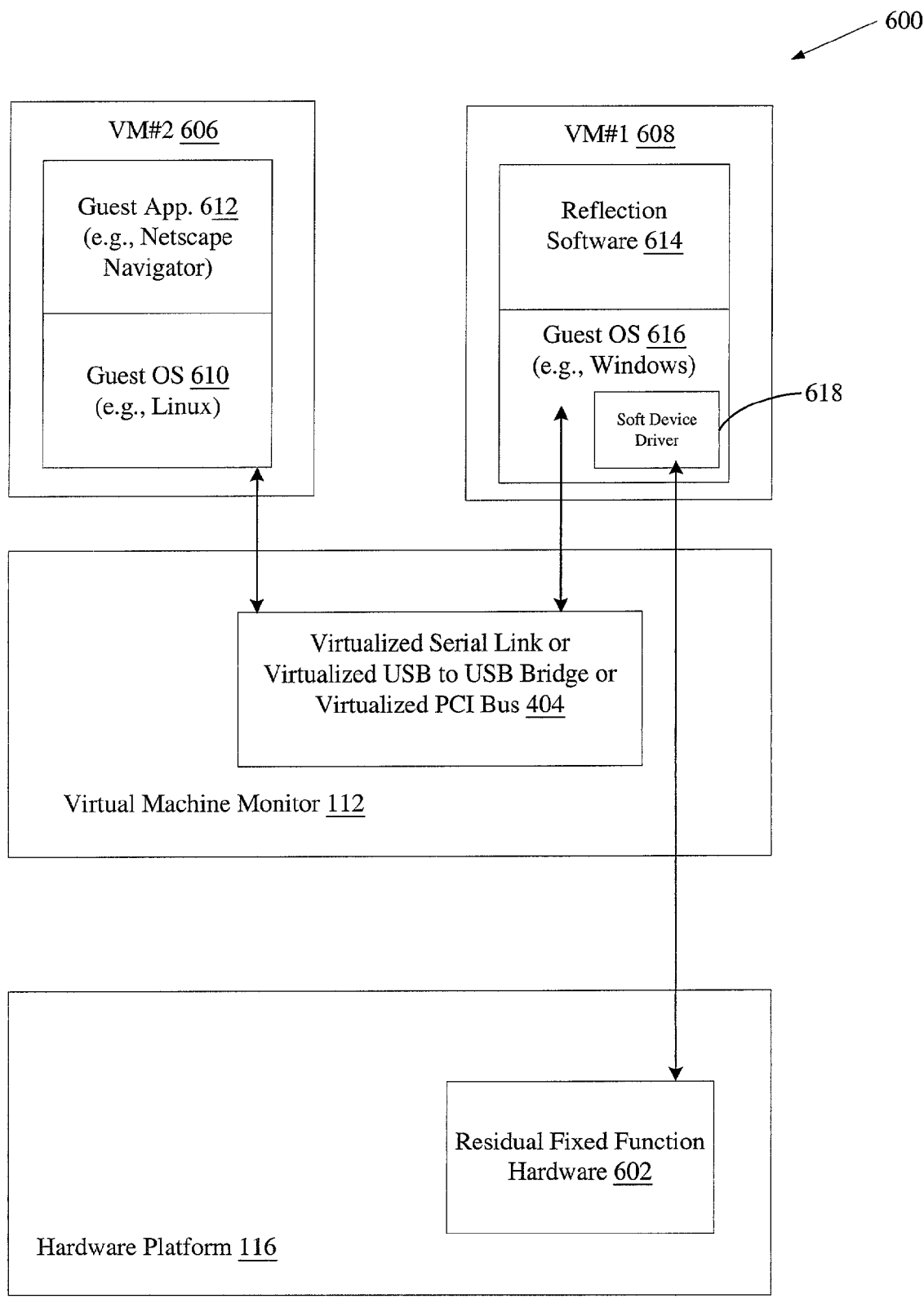
FIGS. 6A-6C illustrate various embodiments of system 400 of FIG. 4.

The above three embodiments will now be described in more detail in conjunction with FIGS. 6A-6C. Referring to FIG. 6A, a dedicated virtual machine 608 is configured to match the underlying host platform. The dedicated virtual machine 608 executes a conventional soft device driver 618 that is written for the OS 616 (e.g., Windows NT 4.0). The main virtual machine 606 runs an arbitrary OS 610 for which no soft device drivers need exist on the market.

In one embodiment, the VMM 112 presents the dedicated virtual machine 608 to the main virtual machine 606 as an external fixed function hardware device (e.g., a "hard" or standard modem) by providing a virtualized serial port 404 (e.g., COM 1), trapping all accesses by the main virtual machine 606 to this virtualized serial port and re-directing them to the dedicated virtual machine 608. Similarly, the VMM 112 may trap the proper set of I/O writes by the dedicated virtual machine 608 and redirect these writes to the main virtual machine 606 as to present them as data from the serial port. In one embodiment, the dedicated virtual machine 608 executes reflection software (e.g., an application or device driver) 614 to link the soft device driver 618 and the virtualized serial port 404 together. For instance, the reflection software 614 may read from the virtualized serial port 404 and write to the soft device driver 618 and vice versa. In one embodiment, the dedicated virtual machine 608 is assigned an Interrupt Request (IRQ) for the main virtual machine 606. The VMM 112 then traps a predefined software instruction or a trap, fault, exception or software interrupt that occurs under predefined conditions in the dedicated virtual machine 608 and reflects each such instruction or occurrence of a trap fault, exception or software interrupt when the predefined conditions hold as an interrupt of the appropriate IRQ to the virtualized Programmable Interrupt Controller (PIC) of the main virtual machine 606.

In another embodiment, the VMM 112 presents the dedicated virtual machine 608 to the main virtual machine 606 as an internal fixed function hardware device by providing a virtualized USB to USB bridge 404, presenting the virtualized USB to USB bridge 404 to each virtual machine 606 and 608 as a USB "host controller" connected to a USB to USB bridge device, trapping all accesses by the main virtual machine 606 to this virtualized USB host controller 404 and re-directing them to the dedicated virtual machine 608. In addition, the VMM 112 traps accesses by the dedicated virtual machine 608 to the USB host controller 404 and redirects these accesses to the main virtual machine 606 as to present them as data from the USB host controller.

In yet another embodiment, the VMM 112 presents the dedicated virtual machine 608 to the main virtual machine 606 as an internal fixed function hardware device or a PCI device by providing a virtualized local bus 404 (e.g., a PCI bus), and trapping and redirecting all accesses to this virtualized local bus 404 in the manner described above.

Figure 6B:
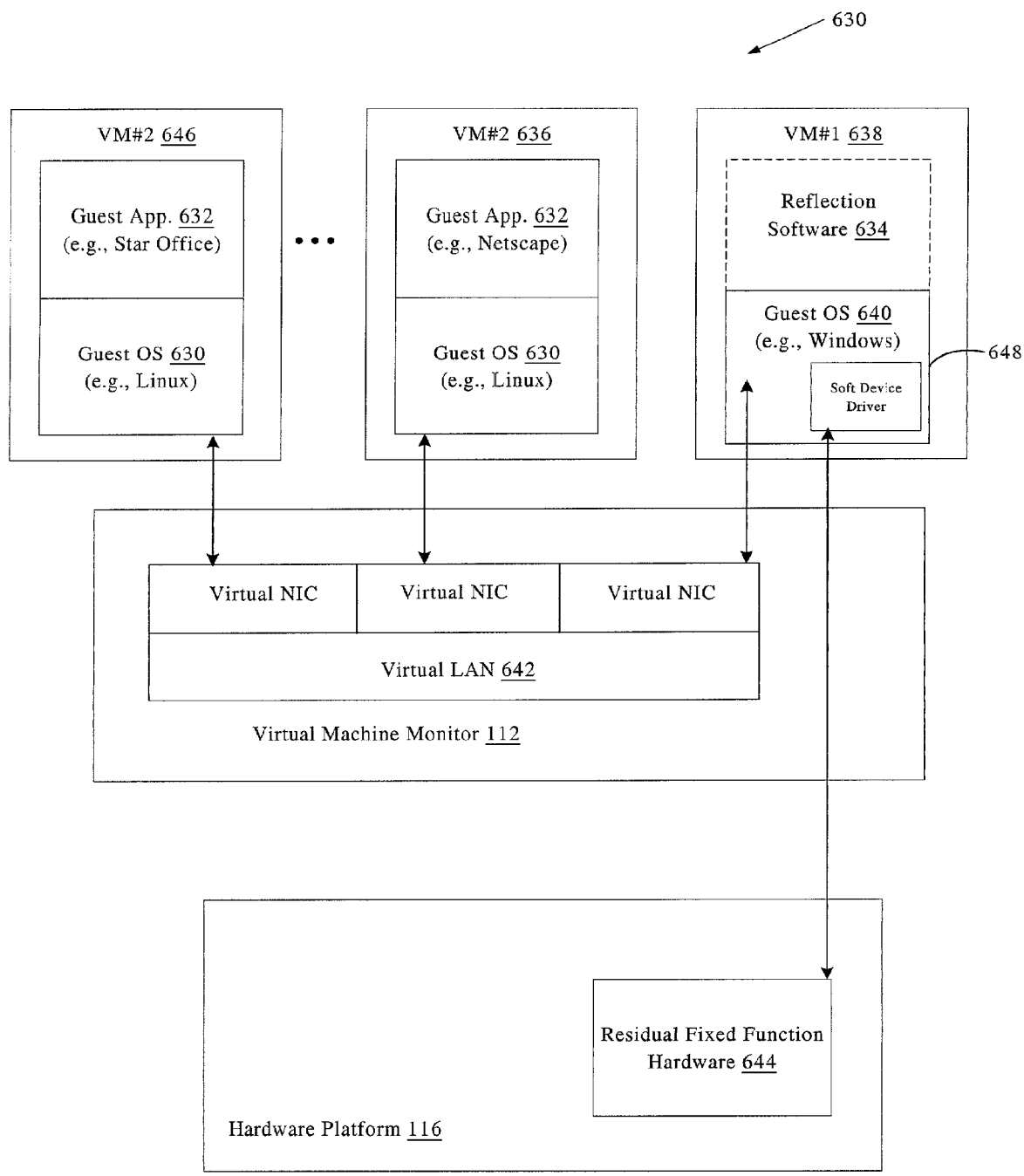

Referring to FIG. 6B, a dedicated virtual machine 638 is configured to match the underlying host platform. The dedicated virtual machine 638 executes a conventional soft device driver 648 that is written for the OS 640 (e.g., Windows NT 4.0). The main virtual machine 636 runs an arbitrary OS 630 for which no soft device drivers exist on the market. Other virtual machines (e.g., a virtual machine 646) also run arbitrary OSes. In this embodiment, the VMM 112 does not present the dedicated virtual machine to other virtual machines as a fixed function hardware device but instead presents it as a PC connected to the other virtual machines via a virtual communication network 642 (e.g., a virtualized LAN presented to each virtual machine 636, 638 or 646 by the VMM 112 as a corresponding virtual NIC). The virtual machines can then communicate to each other via the virtual network controlled by the VMM 112. For instance, the main virtual machine 636 may send a request to the dedicated virtual machine 638 to set a service to use the soft device via the virtual network. In one embodiment, reflection software 634 is used to link the soft device driver 648 and a corresponding virtual NIC together. Alternatively, conventional bridge and routing software can be used for this purpose, thereby obviating the need for the reflection software.

Figure 6C:
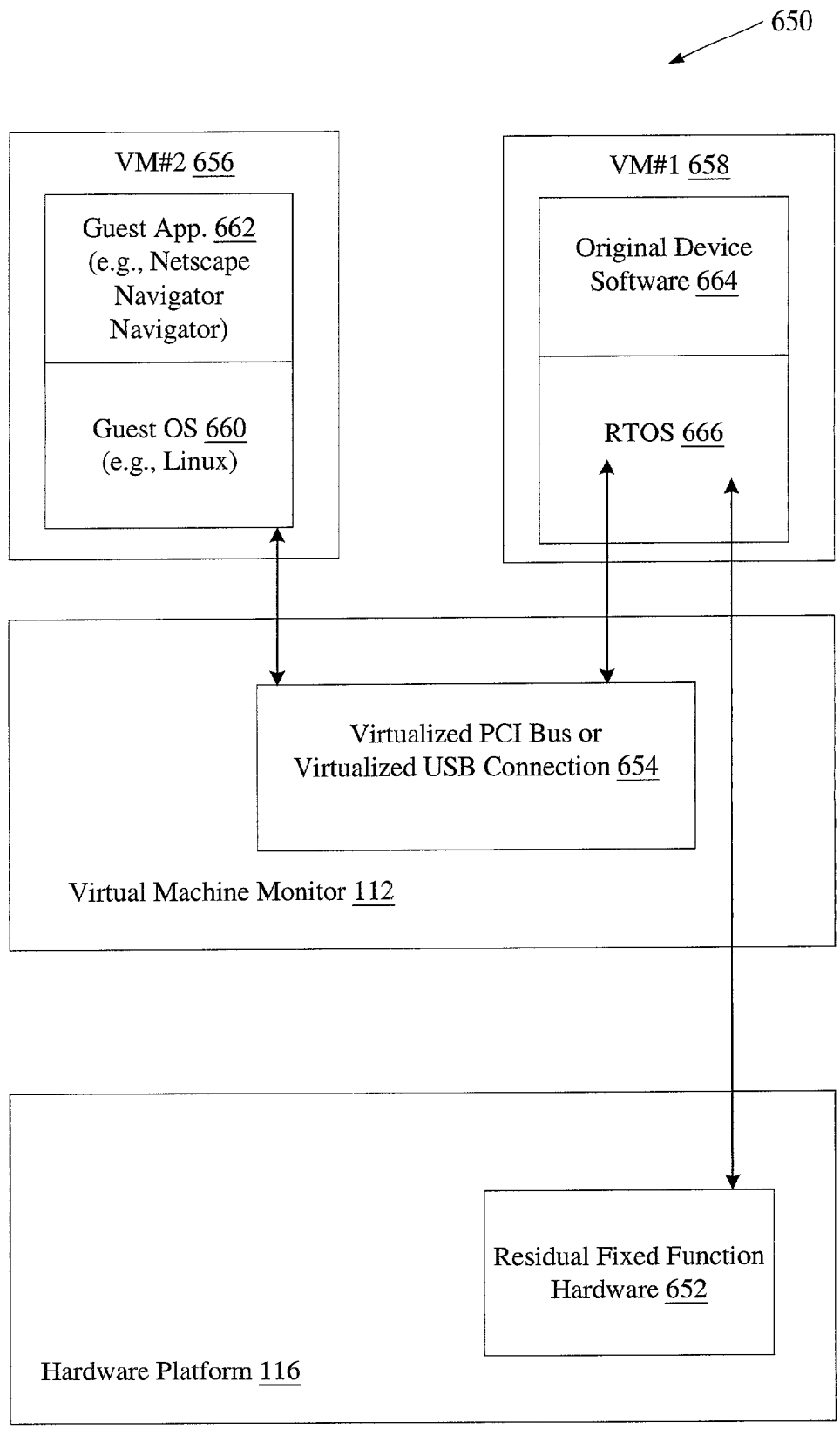

Referring to FIG. 6C, a dedicated virtual machine 658 is configured to match an existing hardware device (e.g., a PCI card). As such, the dedicated virtual machine 658 differs from the host platform. For instance, the dedicated virtual machine 658 may only have a processor, RAM, ROM and a connection to a platform bus (e.g., PCI) or to an external bus (e.g., USB). The dedicated virtual machine 658 may model both RAM and ROM using system RAM assigned to it by the VMM 112.

The VMM 112 emulates communication between the two virtual machines by trapping I/O accesses by the dedicated virtual machine 658 to the virtualized PCI bus or virtualized USB connection 654 and redirecting them to the main virtual machine 655, and vice versa.

As illustrated in FIG. 6C, the dedicated virtual machine 658 runs RTOS 666 which can be chosen to match the OS run by one or more of the processors on a conventional fixed function hardware device. The functionality performed by the software that executes on these processors can be executed in the virtual machine 658 and the residual fixed function hardware 652 can be substituted for the conventional fixed function hardware device. Residual fixed function hardware 652 could be a PCI card, a USB device, or any other standard PC peripheral device.

As opposed to other OSes (e.g., Windows OSes), RTOS 666 does not require a change to a soft device driver each time the PC OS such as Windows is modified. Instead, the dedicated virtual machine 658 that closely matches the PCI card, USB or other PC peripheral device can execute some or all of the software of the original fixed function hardware device. With availability of on chip co-processors (e.g., a digital signal processor (DSP)), the virtual machine may make direct use of on chip co-processors to provide an extended Instruction Set Architecture (ISA) that closely matches the ISA of the processor(s) on the original PCI card. As result, the soft device software that executes on the host processor need not to be different from the software which executes on the original fixed function device, thereby simplifying porting and speed of development of soft devices.

The present invention provides the software vendors with an option of constructing soft devices by reconfiguring a dedicated virtual machine, rather than rewriting soft device driver software. For instance, both approaches can be analyzed and the most efficient approach can be chosen based on the costs involved. For complex conventional fixed function hardware devices multiple virtual machines can be configured, with each VM running the RTOS used by one or more of the processors of the conventional fixed function hardware device and the VMM emulating communication between the processors on the conventional fixed function hardware device using any of a variety of well known techniques including the communication techniques described above. For example, a complex fixed function hardware device may have a serial link between two of its processors.

Figure 7:
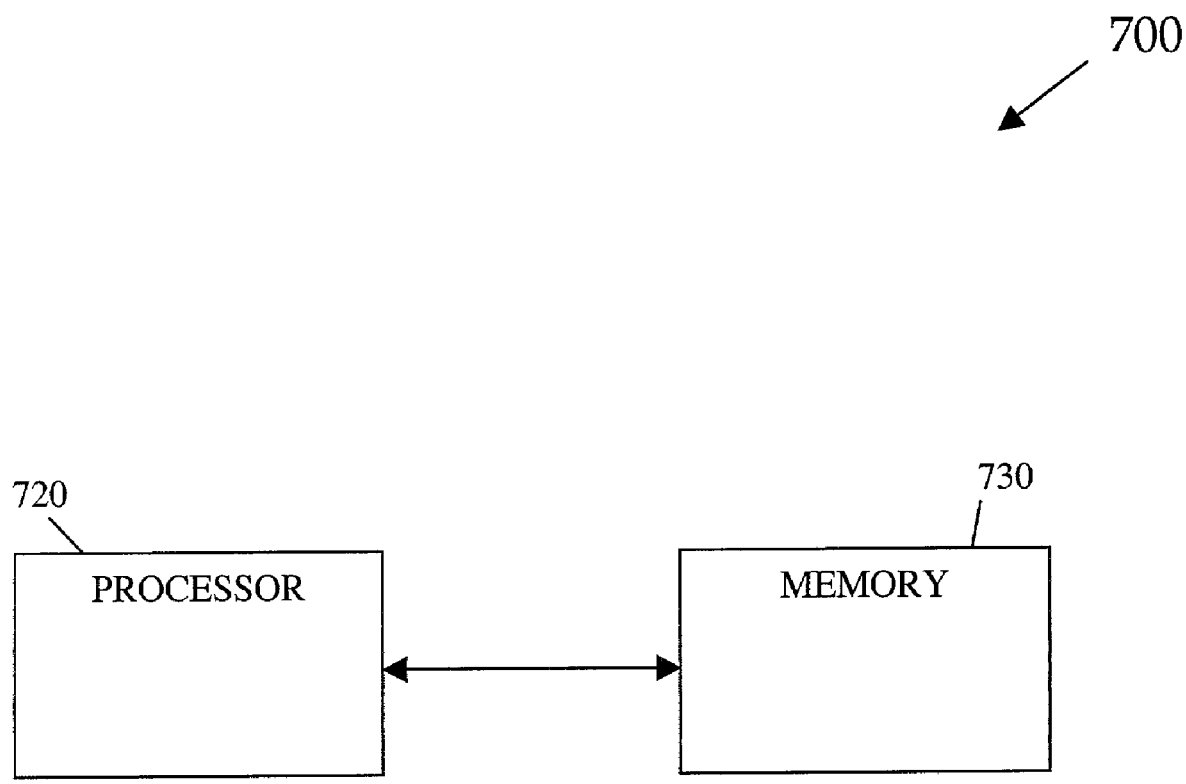
FIG. 7 is a block diagram of one embodiment of a processing system.

FIG. 7 is a block diagram of one embodiment of a processing system. Processing system 700 includes processor 720 and memory 730. Processor 720 can be any type of processor capable of executing software, such as a microprocessor, digital signal processor, microcontroller, or the like. Processing system 700 can be a personal computer (PC), mainframe, handheld device, portable computer, set-top box, or any other system that includes software.

Memory 730 can be a hard disk, a floppy disk, random access memory (RAM), read only memory (ROM), flash memory, or any other type of machine medium readable by processor 720. Memory 730 can store instructions for performing the execution of the various method embodiments of the present invention such as methods 300 and 500 (FIGS. 3 and 5).

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A system comprising:
   a hardware platform including a residual fixed function hardware device represented by a hardware component of a soft device;
   a first virtual machine, coupled to the hardware platform, the first virtual machine including a driver of the soft device, the soft device driver controlling the residual fixed function hardware device;
   a second virtual machine, coupled to the hardware platform, the second virtual machines utilizing the soft device when needed, the soft device being independent of an operating system run by the second virtual machine; and
   a virtual machine monitor (VMM), coupled to the hardware platform and the first and second virtual machines, to present the first virtual machine to the second virtual machine as an external or internal device, and to emulate communication between the first and second virtual machines using a virtualized connectivity means linked to the driver of the soft device,
   wherein the VMM emulates communication between the first and second virtual machines by trapping accesses of one of the virtual machines to the virtualized connectivity means, and redirecting the accesses to another of the virtual machines via the virtualized connectivity means.

2. A method for constructing a soft device, the method comprising:
   implementing a software component of the soft device in a first virtual machine, the software component controlling a residual fixed function hardware device represented by a hardware component of the soft device; and
   making the soft device available for use by a second virtual machine, the soft device being independent of an operating system run by the second virtual machines;
   wherein making the soft device available comprises:
   presenting the first virtual machine to the second virtual machine as an external or internal device; and
   emulating communication between the first and second virtual machines using a virtualized connectivity means linked to the software component of the soft device, wherein accesses to the virtualized connectivity means by one of the virtual machines are trapped and redirected to another of the virtual machines via the virtualized connectivity means.

3. The method of claim 2 wherein emulating communication comprises:
   providing a virtualized serial communications link;
   providing a virtualized serial communications port to each of the first virtual machine and the second virtual machine;
   linking the virtualized serial communications port provided to the first virtual machine to the software component of the soft device using reflection software;
   trapping each access by one of the first virtual machine and the second virtual machine to the virtualized serial communication port; and reflecting said each access to the other of the first virtual machine and the second virtual machine via the virtualized serial communications link.

4. The method of claim 2 wherein emulating communication comprises:
providing a virtualized universal serial bus (USB) to USB bridge device;
providing a virtualized USB host controller to each of the first virtual machine and the second virtual machine;
linking the virtualized USB host controller provided to the first virtual machine to the software component of the soft device using reflection software;
trapping each access by one of the first virtual machine and the second virtual machine to the virtualized USB host controller; and
reflecting said each access to the other of the first virtual machine and the second virtual machine via the virtualized USB to USB bridge device.

5. The method of claim 2 wherein emulating communication further companies:
providing a virtualized peripheral component interconnect (PCI) bus;
linking the virtualized PCI bus to the software component of the soft device using reflection software;
trapping each access by one of the first virtual machine and the second virtual machine to the virtualized PCI bus; and
reflecting said each access to the other of the first virtual machine and the second virtual machine.

6. The method of claim 2 further comprising:
providing a virtual network interface card (NIC) to each of the first virtual machine and the second virtual machine.

7. The method of claim 2 wherein the external or internal device is a hardware device.

8. The method of claim 7 wherein emulating communication comprises:
providing a virtualized peripheral component interconnect (PCI) bus;
trapping each access by one of the first virtual machine and the second virtual machine to the virtualized PCI bus; and
reflecting said each access to the other of the first virtual machine and the second virtual machine via the virtualized PCI bus.

9. The method of claim 7 wherein emulating communication comprises:
providing a virtualized universal serial bus (USB) connection;
providing a virtualized USB bus interface to the first virtual machine;
providing a virtualized USB host controller to the second virtual machine;
trapping each access by one of the first virtual machine and the second virtual machine to the virtualized USB bus; and
reflecting said each access to the other of the first virtual machine and the second virtual machine via the virtualized USB connection.

10. The method of claim 7 wherein the hardware device is any one of a PCI card, an external USB device, an internal USB device, and any other standard personal computer peripheral device.

11. The method of claim 7 wherein presenting the first virtual machine to the second virtual machine as a hardware device further comprises:
configuring the first virtual machine to match the hardware device.

12. The method of claim 11 wherein the software component of the soft device comprises at least a portion of software of a fixed function device.

13. The method of claim 12 further comprising:
varying the portion of software that is used as the software component depending on how closely the first virtual machine matches the hardware device.

14. A method for constructing a soft device, the method comprising:
implementing software components of the soft device in a plurality of dedicated virtual machines, each of the software components controlling a residual fixed function hardware device represented by a hardware component of the soft device; and
making the soft device available for use by a main virtual machine, the soft device being independent of an operating system run by the main virtual machine;
wherein making the soft device available comprises:
presenting the plurality of dedicated virtual machines to the main virtual machine as a hardware device; and
emulating communication between the plurality of dedicated virtual machines and the main virtual machine using a virtualized communication means linked to the software components of the soft device, wherein accesses to the virtualized communication means by one virtual machine are trapped and redirected to another virtual machine via the virtualized communication means.

15. The method of claim 14 wherein the virtualized communication means is any one of a virtualized serial communications link, a virtualized universal serial bus (USB) to USB bridge device, a virtualized peripheral component interconnect (PCI) bus, a virtual network interface card, and a virtualized USB connection.

16. A system comprising:
a hardware platform including a residual fixed function hardware device represented by a hardware component of a soft device;
a virtual machine monitor (VMM), coupled to the hardware platform; and
a plurality of virtual machines, coupled to the virtual machine monitor, the plurality of virtual machines including one or more dedicated virtual machines with one or more software components of the soft device implemented therein, and remaining one or more virtual machines utilizing the soft device when needed, the soft device being independent of any operating system run by the virtual machines; wherein the VMM is to present the dedicated of virtual machines to others of the plurality of virtual machines as a hardware device, and to emulate communication between the dedicated of virtual machines and the other virtual machines using a virtualized communication means linked to the software component of the soft device, the VMiM emulating the communication by trapping accesses of one virtual machine to the virtualized communication means and redirecting the accesses to another virtual machine via the virtualized communication means.

17. The system of claim 16 wherein the VMM is emulating a network communication between the plurality of virtual machines by providing a virtual network interface card (NIC) to each of the plurality of virtual machines.

18. The system of claim 16 wherein the hardware device is any one of a PCI card, an external USB device, an internal USB device, and any other standard personal computer peripheral device.

19. The system of claim 16 wherein the virtualized communication means is any one of a virtualized serial communications link, a virtualized universal serial bus (USB) to USB bridge device, a virtualized peripheral component interconnect (PCI) bus, a virtual network interface card, and a virtualized USB connection.

20. A computer readable storage medium comprising instructions, executed on a processor, causing said processor to perform operations comprising:

implementing a software component of the soft device in a first virtual machine, the software component controlling a residual fixed function hardware device represented by a hardware component of the soft device; and making the soft device available for use by a second virtual machine, the soft device being independent of an operating system run by the second virtual machine;

wherein making the soft device available comprises:

presenting the first virtual machine to the second virtual machine as an external or internal device; and emulating communication between the first and second virtual machines using a virtualized connectivity means linked to the software component of the soft device, wherein accesses to the virtualized connectivity means by one of the virtual machines are trapped and redirected to another of the virtual machines via the virtualized connectivity means.

21. A computer readable storage medium comprising instructions, executed on a processor, causing said processor to perform operations comprising:

implementing software components of the soft device in a plurality of dedicated virtual machines, each of the software components controlling a residual fixed function hardware device represented by a hardware component of the soft device; and making the soft device available for use by a main virtual machine, the soft device being independent of an operating system run by the main virtual machine;

wherein making the soft device available comprises:

presenting the plurality of dedicated virtual machines to the main virtual machine as a hardware device; and emulating communication between the plurality of dedicated virtual machines and the main virtual machine using a virtualized communication means linked to the software components of the soft device, wherein accesses to the virtualized communication means by one virtual machine are trapped and redirected to another virtual machine via the virtualized communication means.

* * * * *

UNITED STATES PATENT AND TRADEMARK OFFICE
CERTIFICATE OF CORRECTION

| | |
|---|---|
| PATENT NO. | : 7,272,831 B2 |
| APPLICATION NO. | : 09/823482 |
| DATED | : September 18, 2007 |
| INVENTOR(S) | : Cota-Robles et al. |

It is certified that error appears in the above-identified patent and that said Letters Patent is hereby corrected as shown below:

Column 6, at line 44, delete "(COML)" and insert --(COM1)--.

Column 10, at line 17, delete "machines" and insert --machine--.

Column 12, at line 59, delete "VMiM" and insert --VMM--.

Signed and Sealed this

Fifteenth Day of April, 2008

JON W. DUDAS
*Director of the United States Patent and Trademark Office*